United States Patent Office 3,164,576
Patented Jan. 5, 1965

3,164,576
PRODUCTION OF COPOLYMERS OF POLYCYCLIC AROMATIC COMPOUNDS
George F. Hardy, Drexel Hill, Pa., assignor to Allied Chemical Corporation, New York, N.Y., a corporation of New York
No Drawing. Filed Mar. 14, 1961, Ser. No. 95,515
14 Claims. (Cl. 260—93.5)

The present invention relates to the production of copolymers of certain polycyclic aromatic hydrocarbons such as anthracene.

It has been known to produce copolymers of anthracene with butadiene, styrene and p-chlorostyrene by emulsion polymerization procedures. However, these procedures have required lengthy reaction times and have resulted in copolymers having a maximum anthracene content of about 12 weight percent. Moreover, attempts to prepare copolymers of anthracene with acrylonitrile, methyl acrylate and vinyl chloride have been unsuccessful.

It is the principal object of this invention to produce certain polycyclic aromatic hydrocarbon copolymers containing up to 50 mol percent of the polycyclic aromatic hydrocarbon.

A more specific object is to produce anthracene copolymers containing up to 50 mol percent of anthracene.

Other objects and advantages of the invention will be apparent to those skilled in the art from the following description and examples.

The above objects are realized by polymerizing a mixture of a monomer comprising a polycyclic aromatic hydrocarbon capable of undergoing the Diels-Alder reaction with maleic anhydride and a comonomer capable of being polymerized by alkali metal catalysis in the presence of a catalyst selected from the group consisting of alkali metals, alkali metal hydrides, alkali metal alkyls, alkali metal aryls and addition compounds of alkali metals with polynuclear aromatic hydrocarbons and recovering a copolymer from the resulting polymerization mass.

By polymerizing under the above operating conditions, copolymers containing up to 50 mol percent of the polycyclic aromatic hydrocarbon are obtained in short reaction times. These copolymers may be used as protective coatings, molding resins and plasticizers.

Any polycyclic aromatic hydrocarbon capable of undergoing the Diels-Alder reaction with maleic anhydride such as anthracene, alkyl derivatives of anthracene, e.g. methyl anthracene, naphthacene, as well as mixtures thereof, may be employed. The Diels-Alder reaction is described in detail in an article by M. C. Kloetzel on pages 1–60 of "Organic Reactions," volume IV, 1948.

The comonomer may be any unsaturated organic compound capable of being itself polymerized by alkali metal catalysis or mixtures of such compounds. Included in this class of compounds are the 1,3-butadienes (e.g. 1,3-butadiene), aryl olefins (e.g. styrene), alkyl styrenes (e.g. alpha-methyl styrene), vinyl naphthalene and similar derivatives thereof, esters of saturated alcohols with mono- and polybasic unsaturated acids (e.g. methyl acrylate), unsaturated nitriles (e.g. acrylonitrile), etc.

The catalyst employed is selected from the class consisting of alkali metals, their hydrides, alkyls (e.g. amyl sodium or butyl lithium), aryls (e.g. phenyl sodium) and addition compounds of the alkali metals with polynuclear aromatic hydrocarbons such as naphthalene. Of the alkali metals potassium, and particularly sodium, are preferred. The activity of these catalysts is proportional to their surface area. Hence, it is desirable to employ them in finely divided state.

The alkali metal catalyst may be prepared in finely divided form by dispersing it in conventional manner in an inert liquid such as petrolatum, light mineral oil, toluene, heptane, etc. If desired, a dispersing agent which aids in the preparation of such catalyst may be used.

Although the amount of the catalyst used is to some extent dependent upon its state of particle size and the purity of the monomers and other reagents used, concentrations of about 0.01 to 5%, preferably about 0.1 to 1%, by weight of the monomer mixture are normally adequate to effect the desired polymerization reaction.

The polymerization reaction may be conducted without an added diluent if the polycyclic aromatic hydrocarbon is soluble in the comonomer employed. For example, anthracene is soluble in styrene and, hence, may be copolymerized therewith in the absence of an added diluent. When butadiene is used as a comonomer, liquid butadiene obtained by operating under pressure would also act as solvent for anthracene. It is preferred, however, to employ an added diluent comprising an organic solvent for the monomer mixture which is inert in the reaction. Suitable diluents include aliphatic and aromatic hydrocarbons such as benzene, cyclohexane, heptane, etc., as well as ethers such as diethyl ether, tetrahydrofuran, 1,2-dimethoxyethane, etc.

Relatively low weight ratio of diluent to monomer mixture is generally employed. However, when less than about 1 part of diluent per part of monomer mixture is used, special agitation is required because of the thickness of the reaction mass. Preferably about 1 to 3 parts of diluent per part of monomer mixture is employed.

The polymerization reaction may be accelerated by the addition of certain ethers to the polymerization mixture as activators. These activators include alkyl monoethers containing at least one methyl group, dialkyl ethers of ethylene glycol, dialkyl ethers of polyethylene glycols and tetrahydrofuran. Alkyl groups other than methyl in the alkyl monoethers contain preferably from 2 to 4 carbon atoms. In the case of the dialkyl ethers of ethylene glycol and polyethylene glycols, the alkyl group contains preferably from 1 to 4 carbon atoms.

Typical examples of the alkyl monoethers are dimethyl ether and methyl ethyl ether. Typical examples of the dialkyl ethers of ethylene glycol and polyethylene glycols are ethylene glycol dimethyl ether, ethylene glycol diethyl ether and diethylene glycol dimethyl ether.

While the activating ether may be used as the diluent for the monomer mixture, it is preferred to employ a small amount of the ether, e.g. about 1 to 5 percent by weight based on the monomer mixture, in conjunction with another diluent.

The reaction temperature may be as low as −80° C. or as high as 150° C., or even higher. Preferably the polymerization temperature is maintained within the range of 0° to 100° C. Although longer reaction times may be used, substantially complete reaction may be attained in reaction times of about 2 to 5 hours.

After the reaction is complete, the reaction may be terminated by adding an alcohol, preferably a monohydric alcohol such as methanol, ethanol or isopropanol. Use of alcohols is advantageous since they destroy the catalyst, soak up residual monomers and dissolve salts. However, if desired, the reaction can be terminated by adding water to the reaction mixture and then distilling to remove unreacted monomers as overhead. Other terminating agents include air, alkyl halides, carbon dioxide, etc.

Generally speaking, the process of this invention enables the obtainment of copolymers containing up to 50 mol percent of polycyclic aromatic hydrocarbon in conversions of about 80% or higher. The reduced viscosities (1 gram/100 cc. in toluene at 25° C.) of the copolymers are at least about 0.05 and usually 0.1 or higher. Such copolymers have molecular weights in the order of about 3,000 to 100,000 or greater.

As the content of polycyclic aromatic hydrocarbon in the copolymers is increased, the resulting products tend to soften at higher temperatures and exhibit greater resistance to solvents and higher heat distortion temperatures.

It is important to avoid the presence of air and water during the reaction. Hence, the reaction is carried out in a clean dry reactor purged with an inert gas such as nitrogen or methane.

In preferred operation, a dispersion of an alkali metal catalyst, an ether activator and an inert organic diluent are charged to the reactor. The reactor is maintained at temperature of about 0° to 100° C. The comonomer is then added in gradual manner over a period of about ½ to 5 hours.

The resulting copolymer is obtained in the form of a solution or dispersion depending upon its solubility in the reaction medium. An alcohol such as methanol is added to terminate the reaction. If the copolymer is in solution, it is precipitated by the alcohol. The copolymer is then filtered off, washed with additional alcohol and finally dried at temperature of about 50° to 100° C.

The following examples illustrate practice of the invention but are not to be construed as limiting the scope thereof. In the examples, parts are by weight.

*Example 1*

A glass reactor was equipped with a stirrer and a nitrogen blanket. 50 parts of anthacene (about 95% purity), 176 parts of benzene, 2 parts of a dispersion of finely divided metallic sodium and 2.6 parts of 1,2-dimethoxyethane were added to the reactor and stirring was initiated.

The sodium dispersion was prepared by subjecting a mixture of 47 parts of finely divided sodium, 52 parts of odorless mineral spirits, 0.85 part of oleic acid and 0.24 part of lecithin to high-speed agitation at 100–110° C.

The nitrogen atmosphere was then replaced by 1,3-butadiene which was maintained at about atmospheric pressure in the reactor during the reaction. The initial temperature of the mixture was 27° C. On adding the 1,3-butadiene the temperature rose slowly to a maximum of 43° C. and then dropped slowly. After four hours, no free anthracene was visible and the flow of 1,3-butadiene was stopped.

396 parts of methanol were then added to the resulting copolymer solution and stirring was continued. The precipitated copolymer was filtered off, washed with methanol containing a trace of Catalin CAO-3 antioxidant (2,6,-di-t-butyl-p-cresol) until no more anthracene could be extracted and finally dried under vacuum at room temperature.

There were obtained 90 parts of anthracene-1,3-butadiene copolymer melting at 65–80° C. The reduced viscosity of the copolymer (1 gram/100 cc. in toluene at 25° C.) was 0.1 (corresponding to a molecular weight of about 5,000), and its anthracene content was about 50 weight percent (about 23 mol percent). Conversion to copolymer was about 95% based on the anthracene fed.

6 parts of anthracene-1,3-butadiene copolymer prepared by the above procedure was dissolved in 4 parts of styrene, and 0.1 part of benzoyl peroxide was added as catalyst. The mixture was placed in a closed vessel and cured for 18 hours at 75° C., followed by 72 hours at 110° C. The resulting product was a clear, strong material having a Barcol hardness (standard measurement of surface hardness) of 65.

*Example 2*

Using the same apparatus employed in Example 1, 50 parts of anthracene (about 95% purity), 178 parts of tetrahydrofuran and 1 part of a dispersion of finely divided metallic sodium (such as used in Example 1) were mixed under an atmosphere of nitrogen. During the next 3½ hours, 50 parts of styrene were gradually added. At the end of this time, no free anthracene was visible.

After stirring the resulting copolymer solution for an additional 75 minutes, 396 parts of methanol and 3.6 parts of oleic acid were added.

The precipitated copolymer was filtered off and washed with methanol until no more anthracene was extracted. The copolymer was then dried at 70° C.

The dried product comprising a copolymer powder of anthracene and styrene weighed 88 parts and melted at 210–230° C. The reduced viscosity of the copolymer was 0.09 (corresponding to a molecular weight of about 10,000), and its anthracene content was about 50 weight percent (about 37 mol percent). Conversion to copolymer was about 93% based on the anthracene fed.

The copolymer powder was molded into a hard, clear disk by pressing the powder between heated metal plates. The molded disk was not visibly affected by prolonged immersion in boiling water, or acetone at room temperature.

While the preferred embodiments for carrying out the invention have been described, it will be apparent that many changes may be made without departing from the spirit of the invention. For example, the processes described above may be carried out in continuous as well as batch manner.

I claim:

1. A process which comprises polymerizing a mixture of a polycyclic aromatic hydrocarbon monomer selected from the group consisting of anthracene, alkyl derivatives of anthracene and naphthacene and a comonomer selected from the group consisting of conjugated diolefins, vinyl aromatic compounds, esters of saturated alcohols with unsaturated acids and unsaturated nitriles in the presence of a catalyst selected from the group consisting of alkali metals, alkali metal hydrides, alkali metal alkyls, alkali metal aryls and addition compounds of alkali metals with polynuclear aromatic hydrocarbons, and recovering a copolymer containing up to 50 mol percent of the polycyclic aromatic hydrocarbon from the resulting polymerization mass.

2. The process of claim 1 wherein the polycyclic aromatic hydrocarbon is anthracene.

3. The process of claim 1 wherein the polycyclic aromatic hydrocarbon is anthracene and the comonomer is 1,3-butadiene.

4. The process of claim 1 wherein the polycyclic aromatic hydrocarbon is anthracene and the comonomer is styrene.

5. The process of claim 2 wherein the catalyst is finely divided metallic sodium.

6. The process of claim 3 wherein the catalyst is finely divided metallic sodium.

7. The process of claim 4 wherein the catalyst is finely divided metallic sodium.

8. The process of claim 2 carried out in the presence of an inert organic diluent.

9. The process of claim 3 carried out in the presence of an inert organic diluent.

10. The process of claim 4 carried out in the presence of an inert organic diluent.

11. A process which comprises polymerizing a mixture of a polycyclic aromatic hydrocarbon monomer selected from the group consisting of anthracene, alkyl derivatives of anthracene and naphthacene and a comonomer selected from the group consisting of conjugated diolefins, vinyl aromatic compounds, esters of saturated alcohols with unsaturated acids and unsaturated nitriles in the presence of (1) a catalyst selected from a group consisting of alkali metals, alkali metal hydrides, alkali metal alkyls, alkali metal aryls and addition compounds of alkali metals with polynuclear aromatic compounds, (2) an inert organic diluent and (3) a small amount of an ether selected from the group consisting of alkyl monoethers containing at least one methyl group, dialkyl ethers of ethylene glycol, dialkyl ethers of polyethylene glycols and tetrahydrofuran as activator, and recovering a copolymer containing up to 50 mol percent of the polycyclic aromatic hydrocarbon from the resulting polymerization mass.

12. The process of claim 11 wherein the polycyclic aromatic hydrocarbon is anthracene.

13. The process of claim 11 wherein the polycyclic aromatic hydrocarbon is anthracene and the comonomer is 1,3-butadiene.

14. The process of claim 11 wherein the polycyclic aromatic hydrocarbon is anthracene and the comonomer is styrene.

References Cited in the file of this patent

UNITED STATES PATENTS

| | | |
|---|---|---|
| 2,146,447 | Scott | Feb. 7, 1939 |
| 2,979,509 | Warner | Apr. 11, 1961 |

FOREIGN PATENTS

| | | |
|---|---|---|
| 687,521 | Great Britain | Feb. 18, 1953 |